US010636201B2

(12) United States Patent
Mitchell et al.

(10) Patent No.: US 10,636,201 B2
(45) Date of Patent: Apr. 28, 2020

(54) REAL-TIME RENDERING WITH COMPRESSED ANIMATED LIGHT FIELDS

(71) Applicant: Disney Enterprises, Inc., Burbank, CA (US)

(72) Inventors: Kenneth J. Mitchell, Glendale, CA (US); Charalampos Koniaris, Glasgow (GB); Malgorzata E. Kosek, Edinburgh (GB); David A. Sinclair, Edinburgh (GB)

(73) Assignee: Disney Enterprises, Inc., Burbank, CA (US)

( * ) Notice: Subject to any disclaimer, the term of this patent is extended or adjusted under 35 U.S.C. 154(b) by 22 days.

(21) Appl. No.: 15/971,950

(22) Filed: May 4, 2018

(65) Prior Publication Data

US 2018/0322691 A1 Nov. 8, 2018

Related U.S. Application Data

(60) Provisional application No. 62/502,399, filed on May 5, 2017.

(51) Int. Cl.
*G06T 15/80* (2011.01)
*G06T 15/00* (2011.01)
*G06T 7/586* (2017.01)
*G06T 15/06* (2011.01)
*G06F 3/01* (2006.01)
*G06T 15/08* (2011.01)

(52) U.S. Cl.
CPC .............. *G06T 15/80* (2013.01); *G06F 3/013* (2013.01); *G06T 7/586* (2017.01); *G06T 15/005* (2013.01); *G06T 15/06* (2013.01); *G06T 15/08* (2013.01)

(58) Field of Classification Search
None
See application file for complete search history.

(56) References Cited

U.S. PATENT DOCUMENTS

| 9,573,062 B1* | 2/2017 | Long | H04N 13/117 |
| 2002/0080136 A1* | 6/2002 | Kouadio | G06T 15/04 |
| | | | 345/426 |
| 2006/0031917 A1* | 2/2006 | Winder | H04N 21/2365 |
| | | | 725/135 |

(Continued)

*Primary Examiner* — Edward Martello
(74) *Attorney, Agent, or Firm* — Patterson + Sheridan, LLP

(57) ABSTRACT

Systems, methods, and articles of manufacture for real-time rendering using compressed animated light fields are disclosed. One embodiment provides a pipeline, from offline rendering of an animated scene from sparse optimized viewpoints to real-time rendering of the scene with freedom of movement, that includes three stages: offline preparation and rendering, stream compression, and real-time decompression and reconstruction. During offline rendering, optimal placements for cameras in the scene are determined, and color and depth images are rendered using such cameras. Color and depth data is then compressed using an integrated spatial and temporal scheme permitting high performance on graphics processing units for virtual reality applications. The compressed content may be decoded and reconstructed in real-time by selecting, using heuristics, cameras that provide useful data for a viewer, selecting grid cells from those cameras that are visible to the viewer, and using a ray marching technique to reconstruct the scene.

20 Claims, 6 Drawing Sheets

(56) References Cited

U.S. PATENT DOCUMENTS

2009/0153556 A1* 6/2009 Nam .................. G06T 15/06
  345/421
2014/0232822 A1* 8/2014 Venkataraman ....... H04N 5/225
  348/43

* cited by examiner

REAL-TIME RENDERING WITH COMPRESSED ANIMATED LIGHT FIELDS

CROSS-REFERENCE TO RELATED APPLICATIONS

This application claims benefit of U.S. provisional patent application Ser. No. 62/502,399, filed May 5, 2017, which is herein incorporated by reference in its entirety.

BACKGROUND

Field

Aspects of the disclosure presented herein relate to image rendering and, more specifically, to rendering images using compressed animated light fields.

Description of the Related Art

Recently, virtual reality (VR) has become practical for widespread consumer adoption with a variety of hardware releases of head-mounted displays (HMDs). However, the real-time rendering performance requirements for VR content are typically much higher than for non-VR rendering. As a result, VR content has traditionally been rendered with lower-complexity visuals than non-VR rendering. For example, cinematic-quality VR graphics could not be rendered in real time.

Immersive 360-degree videos (monoscopic or stereoscopic) have also emerged as a popular form of content. However, such videos are typically captured assuming specific eye locations. As a result, traditional immersive 360-degree videos lack motion parallax and can result in immersion breaking and the feeling that the content is flat, or even discomfort, when viewers' eyes diverge from the specific eye locations from which the videos were captured. To prevent such immersion breaking and discomfort, the content being displayed to the user must be modified to appear correct from any given eye location and head angle. However, this typically requires capturing and rendering the content from a very large number of eye locations, thereby increasing authoring, storage, processing, and bandwidth costs, among other things.

SUMMARY

One embodiment of this disclosure provides a computer-implemented method that generally includes determining placements for a plurality of virtual cameras in a virtual scene. The placements for the plurality of virtual cameras provide full motion light field visibility. The method further includes rendering the virtual scene using the virtual cameras at the determined placements, where the rendering produces color data and depth data. In addition, the method includes compressing the color data and the depth data. The method may also include decompressing at least a portion of the compressed data, and reconstructing one or more video frames using the decompressed portion of the compressed data.

Other embodiments include, without limitation, a computer-readable medium that includes instructions that enable a processing unit to implement one or more embodiments of the disclosed method, as well as a system configured to implement one or more aspects of the disclosed method.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
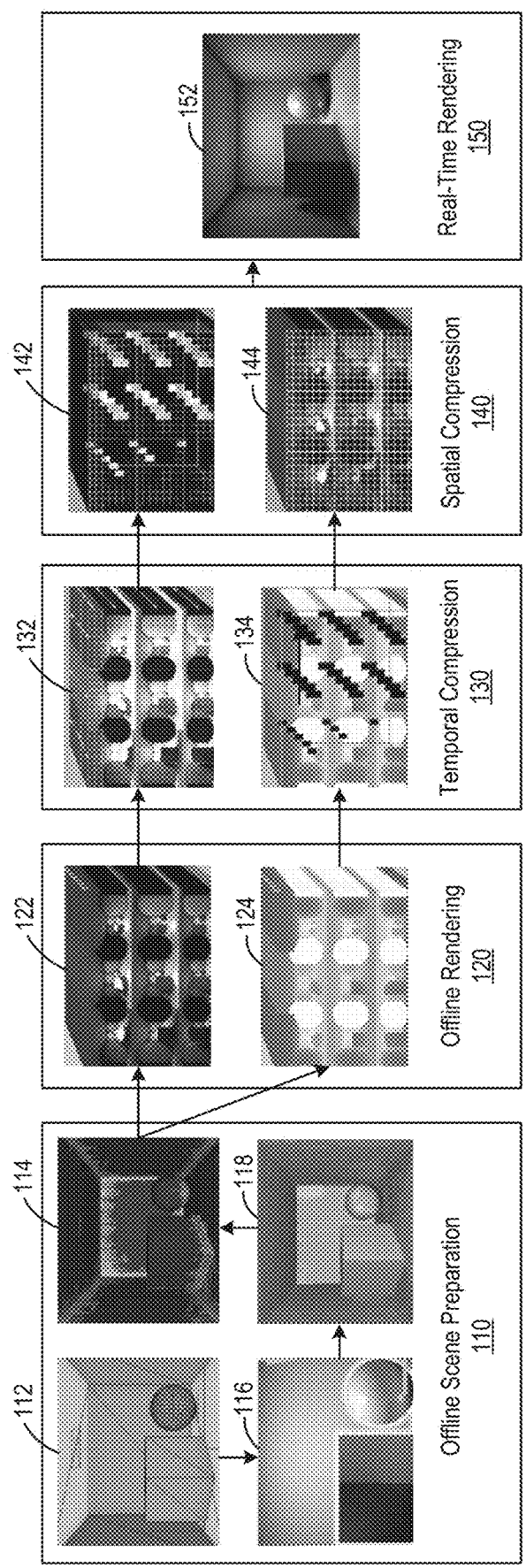
FIG. 1 illustrates an approach for generating compressed animated light fields and real-time decompression and rendering using the same, according to an embodiment.

Embodiments presented herein provide techniques for real-time rendering using compressed animated light fields. In one embodiment, a pipeline from offline rendering of an animated virtual scene from sparse optimized viewpoints to real-time rendering of the scene with freedom of movement includes three stages: offline preparation and rendering, stream compression, and real-time decompression and reconstruction (i.e., rendering). During the offline rendering stage, an offline rendering and compression application determines optimal placements for a number of virtual cameras (e.g., 360° cubemap cameras) in a scene and renders color and depth images using those cameras. Determining the camera placements may include determining a minimum number of cameras needed to capture the scene and provide full motion light field visibility while avoiding redundancy (e.g., if a point can be seen from one camera, the point does not need to be seen by any other camera), depending on lighting environment complexity. As used herein, "full motion light field visibility" refers to full motion light fields being reconstructable from sparse placements of cameras. In one embodiment, the camera placement may utilize an objective function that gives the "quality" of a camera at a position based on how much of a surface seen by the camera is not already seen by other cameras.

Subsequent to determining the placement of cameras and offline rendering using such cameras, the offline rendering and compression application may compress color and depth data (e.g., regular color video frames, also referred to herein as "video frames," and corresponding depth frames) from the rendering using a modular video format that permits the compressed content to later be decoded and rendered in real-time. In one embodiment, temporal color and depth compression may be performed separately. In such a case, the temporal color compression may include determining a smallest selection of keyframes from the rendered video frames that can be used to derive the remaining frames on a per-cell basis, where each video frame is partitioned into a regular grid with multiple grid cells and the determined keyframe cells are stored along with an array of per-frame parameter values used to interpolate the closest keyframes forward and backward in time. The temporal depth compression may include storing each of the depth frames as either a keyframe with all frame data or a P-frame that only encodes differences to the last keyframe which are determined as axis-aligned bounding boxes. In addition to temporal color and depth compression, the offline rendering and compression application may also perform spatial compression using hardware-accelerated block-compression texture formats.

The compressed content may later be decoded and reconstructed in real-time from an arbitrary viewpoint within the predefined viewing volume. In one embodiment, a real-time rendering application first selects, for a video frame to be displayed to a user, a number of cameras that provide useful data using a set of view-selection heuristics. The rendering application then selects grid cells from those cameras that are visible to the viewer and uses a ray-marching technique to determine individual pixel color values of the video frame that may be displayed to the user via, e.g., a head-mounted display or other display device such as a screen or even projected in a dome.

Herein, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., an offline rendering and compression application and a real-time rendering application) or related data available in the cloud. For example, an offline rendering and compression application could execute on a computing system in the cloud and perform the scene preparation, offline rendering, and compression disclosed herein, and real-time rendering application could execute on a computing system in the cloud and perform the real-time decompression and reconstruction disclosed herein. Doing so allows a user to access this information from any computing system attached to a network connected to the cloud (e.g., the Internet).

Referring now to FIG. 1, an approach is shown for generating compressed animated light fields and real-time decompression and rendering using the same, according to an embodiment. As shown, after receiving animated virtual scene data 112 and a volume that a viewer will be in, an offline rendering and compression application ("offline application"), such as the application 622 shown in FIG. 6 and discussed below, is responsible for scene preparation including the determination of virtual camera placements at 110, offline rendering of the scene using the placed cameras at 120, and temporal and spatial compression of the rendered color and depth data (e.g., regular color video frames and corresponding depth frames) at 130-140, each of which is discussed in greater detail below. Subsequent to the offline rendering and compression, the 3D scene is reconstructed at 150 by a real-time rendering application, such as the application 623 shown in FIG. 6 and discussed below, which determines, for each video frame displayed to a user, a set of cameras and parts of the those cameras that are visible to the user, and then performs a ray-marching technique to determine individual pixel values. Although discussed with respect to single applications herein, in alternative embodiments more than one application may perform the functionality of the offline application and/or the real-time rendering application.

In one embodiment, the offline application may employ the following rendering equation in determining the placement of a sparse set of cameras, which are able to capture the scene environment and provide full motion light field visibility, as part of the scene preparation at 110:

$$L_O(x, \omega_0, \lambda, t) = L_e(x, \omega_0, \lambda, t) + \int_\Omega f_r(x, \omega_i, \omega_0, \lambda, t) L_i(x, \omega_i, \lambda t)(\omega_i \cdot n) d\omega_i, \quad (1)$$

where $L_O$, $L_e$, and $L_i$ are the outgoing, emissive, and incoming spectral radiances at a light wavelength $\lambda$ at a time t and a position x with surface normal n, while $\omega_0$ and $\omega_i$ are the outgoing and incoming light directions and $f_r$ is the bidirectional reflectance distribution function. In particular, the camera placement process may include determining a set C of 360° cubemap cameras (each having six faces and generating, e.g., 1024×1024×6 cubemaps) that capture required data for reconstruction of a lighting environment from any point of view, which requires the offline application to evaluate the rendering equation $L_O$ for any parameter value. It should be understood that in a simplified lighting model without participating media, the evaluation of the rendering equation $L_O$ is enough to evaluate the time-parameterized formulation of a plenoptic function. In one embodiment, the integral evaluation of equation (1) is solved over various levels of lighting environment and scene complexity, such as a diffuse-only static environment, a diffuse/specular environment, and a dynamic environment. The notation above will be used herein, in which the rendering equation integral is defined over all points x in a union of all surfaces $S = \cup S_i$.

In the diffuse lighting case, the offline application can be configured to determine placements for cameras such that each of the cameras captures as much novel scene data as possible, i.e., each camera is placed so as to capture new data rather than data that other cameras have captured. This optimization is possible, as surfaces can be viewed from any angle without affecting their colors in diffuse lighting environments, i.e., cameras need to be placed that can see all of the surfaces in the scene. Mathematically, the $f_r$ reflectance term in the rendering equation $L_O$ does not depend on the incoming direction of light $\omega_0$ for diffuse lighting, and the incoming light integral at a point is, regularly, independent of the outgoing direction $\omega_i$. As a result, the integral in equation (1) at a point x, time t, and wavelength $\lambda$ may be reused for any angle $\omega_0$, such that points can be rendered from any camera angle and the resulting rendered data used to reconstruct the points for any viewing direction. The practical consequence for camera placement is that, if a point is seen from one camera, that point does not need to be seen by any other camera.

In one embodiment, the offline application may evaluate camera placements using an objective function $f$ for the "quality" of a camera position O, given an existing set of cameras $C_i$, where $i \in [1, C_{num}]$ for a diffuse lighting environment, with the quality depending solely on how much of the surface the camera sees that is not already seen by other cameras, thereby effectively minimizing redundancy. Such an objective function may be evaluated for cameras placed in different locations (e.g., randomly) in a brute-force manner, through a non-linear search, or in any other suitable manner. A minimum viewer distance function $Z(x)$ may also be used to set a limit on how close a camera can get to a surface as, without such a limit, an infinite number of cameras would need to be placed at an infinitesimal distance from all surfaces in order to cover an entire scene at an adequate sample rate. In order to calculate the objective function $f$, a visibility function $V: \mathbb{R}^3 \to \{0,1\}$ may be used as well as the following helper functions:

$$I_{suit}(O, x) = V(O, x) e^{-kmax(|x\vec{O}| - Z(x), 0)} \quad (2)$$

$$I_{cov}(O, x, C) = \max\{I_{suit}(O, x) - \max_{i \in [1, C_{num}]} I_{suit}(C_i, x), 0\} \quad (3)$$

$$f(O, C, S) = \int_S I_{cov}(O, x, C) dx, \quad (4)$$

where $I_{suit}$ is a compound camera "suitability" term (camera-to-point visibility term multiplied by a proximity term $e^{-kmax(|\vec{xO}|-Z(x),0))}$ and $I_{cov}$ is a redundancy penalization term due to existing coverage. The proximity term $e^{-kmax(|\vec{xO}|-Z(x),0)}$ uses exponential decay with a rate k after the threshold distance Z(x) discussed above is exceeded, so that closer cameras are preferred but the importance of covering a point does not drop to zero. Examples of a signed distance field for the minimum viewer distance 114 and camera placement visibility coverage 116 are shown in FIG. 1. The offline application obtains the optimal camera as the position that maximizes $f$:

$$h(C, S) = \text{argmax}_{O \in \mathbb{R}^3} f(O, C, S) \quad (5)$$

In one embodiment, the offline application may employ algorithm 1 below to determine the placement of a set of cameras.

| Algorithm 1 Calculating a set of cameras |
|---|
| Precondition: A union of surfaces S |
| 1: function OptimalCameraSet(S) |
| 2:     C ← ∅ |
| 3:     do |
| 4:         O ← h(C, S) |
| 5:         y ← f (O, C, S) |
| 6:         if y > 0 then |
| 7:             C ← C ∪ O |
| 8:     while y > 0 |
| 9:     return C |

Such an optimization may be used to generate locally optimal cameras. While a global solver could potentially generate a smaller set of cameras, a global solver would also be much slower computationally and may be infeasible for complex, long scenes. Further advantages of using a locally optimal but iterative method include that (a) offline rendering may start immediately after a camera has been calculated and (b) if in the future a larger volume would need to be covered using the same 3D scene, the optimization would continue using the existing camera as a starting point.

In contrast to the diffuse lighting case, placement of cameras is view-dependent for specular lighting. View-dependency means the color of a surface (e.g., a mirror or glass surface) varies depending on the angle that the surface is viewed from, which requires data to be collected from every angle and therefore more cameras. In one embodiment, the objective function of equation (4) may be modified to account for the requirement that points on all surfaces need to be rendered from all possible directions. In order to express this requirement in a manner that the number of determined cameras remain finite, a minimum view angle θ may be specified between the vector from a point on the surface to two camera positions: the currently tested position and an existing position. The redundancy penalization term $I_{cov}$ may then be modified using an extra angular weight term:

$$I'_{cov}(O, x, C) = I(\theta \geq \angle(\vec{xO}, \vec{xC_i}))I_{cov}(O, x, C). \quad (6)$$

When the bidirectional reflectance distribution function (BRDF) is known, the places where variations occur most may be identified and θ parameterized over the hemisphere accordingly in order to lower the number of required cameras. Otherwise, to optimize a fixed camera set for a dynamic scene, the scene geometry S may be parameterized in time and integrated over time in the objective function:

$$f(O, C, S) = \int_{t=t_0}^{t_1} \int_{S(t)} I_{suit}(O,x) I_{cov}(O, x, C) dx dt \quad (7)$$

The objective function of equation (7) may be used to determine an optimal set of cameras that remain fixed throughout a scene animation, and data generated using such cameras may further be compressed using compression techniques, discussed in greater detail below. An example of view dependent coverage 118 in camera placement is shown in FIG. 1.

Illustratively, the offline application renders color cubemaps 122 and depth cubemaps 124 at 120 using cameras placed at the locations determined at 110, and the offline application then performs temporal and spatial compression at 130-140 to compress the rendered color cubemaps 122 and depth cubemaps 124. Temporal compression compresses data over a series of frames and may produce a greater compression ratio for longer videos while having no effect on static frames, whereas spatial compression compresses data within individual frames. Compression is performed to process color and depth images into compressed streams, one per cubemap face per viewpoint sample. In addition, the final compressed data may be organized per stream in one embodiment with an additional metadata header that describes the stream configuration and locations of local sample viewpoints. Such compressed data may then be used to reconstructed animated frames in real-time from any viewpoint. As shown, the color 122 and depth 124 cubemaps are compressed separately to generate linear color block transitions 132 and axis-aligned bounding boxes (AABBs) of depth changes 134. It should be understood that color compression and depth compression exhibit different characteristics. Color compression can be much lossier than depth compression, as depth inaccuracies result in bad reconstructions which has a propagating effect to color reconstructions. Further, color pixel values can change at a much higher frequency than depth due to, e.g., noise that exists as a result of the rendering equation's approximation of integrals. In addition, depth is shading-invariant, as shadows, lighting changes, and ray bounces do not affect depth. Some embodiments attempt to exploit such characteristics in order to compress the color cubemaps 122 and depth cubemaps 124 to a format capable of being rapidly decompressed and uploaded to a graphics processing unit (GPU) as texture data, while trying at the same time to minimize the required bandwidth.

Figure 2:
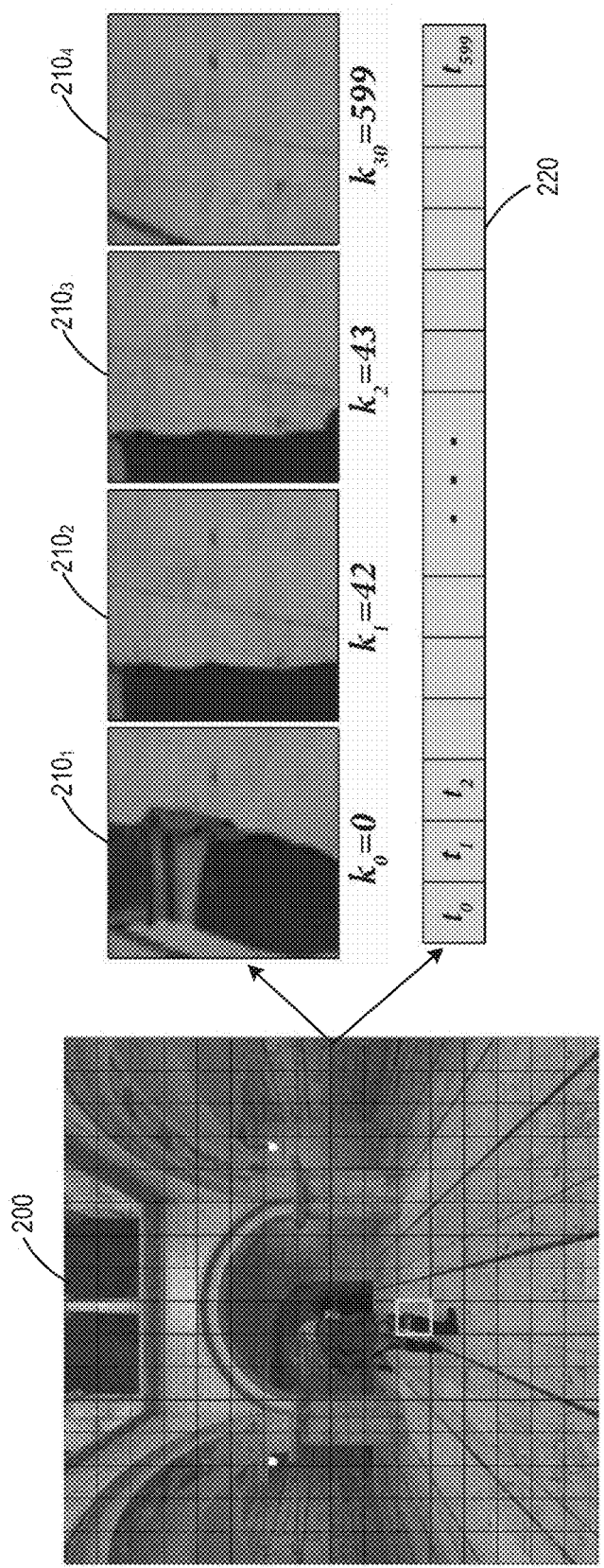
FIG. 2 illustrates an example of color compression, according to an embodiment.

In one embodiment, the temporal color compression performed by the offline application attempts to find a smallest selection of keyframes that can be used to derive the rest of the rendered video frames (bidirectionally predicted, B-frames), on a per-cell basis. For each cell, the compression (and later decompression) may be performed independently, i.e., the offline application may compress the cells in parallel. It should be understood that the cells are themselves videos, and compression may be applied to all of the faces of the cubemap cameras described above. An example of color compression according to an embodiment is shown in FIG. 2. As shown, an image 200 is first partitioned to a regular grid. For example, a grid with cell size between 32 and 256 pixels per dimension may be used. The offline application then stores, in each grid cell, a number of keyframe cells $210_{1-4}$, which are denoted as $k_i$, and an array 220 of per-frame parameter values $t_j$ that interpolate the closest keyframes forward and backward in time. Formally, let $B_x$ be a cell of size D, where x is the frame index $\in [0, N)$. The next optimal keyframe index h given a starting keyframe index m may be calculated as follows. The reconstruction for a B-frame cell $B_x$ is a simple linear interpolation of two nearest frame cells, m and n where m≤x≤n, using a per-frame per-cell parameter t:

$$r(n, t) = (1-t)B_m + t(B_n), \quad t \in [0,1]. \quad (8)$$

As shown by equation (8), decoding the compressed data in the GPU may be an efficient linear interpolation operation.

In one embodiment, peak signal-to-noise ratio (PSRN) may be used as a quality metric q for the reconstruction:

$$q(x, n, t) = PSNR(B_x, r(n, t)). \quad (9)$$

In addition, per-frame parameters g may be calculated to maximize quality:

$$g(x, n) = \text{argmax}_g q(x, n, t) \quad (10)$$

Further, the offline application may determine keyframe indices h that make the distance between keyframes as large as possible, while guaranteeing a minimum level of reconstruction quality:

$$I_q(x, n) = I(\min_{x \in ]m,n[} q(x, n, g(x,n)) > Q) \quad (11)$$

$$h = \text{argmax}_{x \in ]m,N[}(nI_q(x, n)), \quad (12)$$

where $I_q$ is an indicator function that returns 1 only if the reconstruction quality for a range of frames is for all frames in a given range, above a threshold Q. Intuitively, the keyframes may be determined as those frames that in-between frames do not differ from much, and the in-between frames may each be represented by a scalar value $t_j$ specifying how to interpolate between keyframes that are immediately before and after the in-between frame. As described, the scalar values may be, e.g., between 0 and 1 and determined using an optimization process that minimizes a reconstruction error between interpolated and reference frames. The optimization process for a cell according to one embodiment is shown in algorithm 2, with t values being quantized to a byte for each such value.

---

Algorithm 2 Temporal color compression for an image cell B

Precondition: An animated image cell B with N frames
Output: Vector k of keyframe indices and a vector t of per-frame parameters
1: function CompressColorBlock(B, N)
2:     $k_0 \leftarrow 0$
3:     $i \leftarrow 0$
4:     do
5:       $i \leftarrow i + 1$
6:       $k_i \leftarrow h(B, k_{i-1})$
7:       for $x \in [k_{i-1}, k_i]$ do
8:         $t_x \leftarrow g(B, x, k_{i-1}, k_i)$
9:     while $k_i < (N - 1)$
10:    return k, t

---

The temporal color compression described above is agnostic to how the underlying frame data is stored, with the only requirement being that the data in a cell needs to be independent from other cells. Two further optimizations may also be used: view-dependent decoding and spatial re-compression, each of which is discussed in greater detail below.

Returning to FIG. 1, in addition to the color compression described above, the temporal compression at 130 also includes temporal depth compression of the rendered depth cubemaps 124. In terms of reconstruction, depth is more important than color, as geometry may be registered incorrectly if depth is incorrect. As such, the goal should be a temporal depth compression with nearly-lossless quality. In one embodiment, the offline application stores each depth frame as either a keyframe in which all data for the frame is stored, or a P-frame which only encodes differences to a last keyframe. Doing so exploits the fact that depth maps captured by a static camera typically display low frequency of updates. In particular, the differences in the P-frames may be encoded using a set of AABBs, with each P-frame storing a list of AABB coordinates and the raw depth data included in each such coordinate. AABBs are used, as the data memory layout maps well to GPU texture update functions, making the updating of a depth video texture simply a serial set of texture update calls, using the depth data as-is from the P-frame data stream. The depth compression process according to an embodiment is shown in algorithm 3, below. By calculating as-tight-as-possible AABBs, the least number of pixels may be updated. It should be understood that (1) the offline application is only interested in the "leaf level" of an AABB hierarchy, (2) calculation time is not a priority, as the compression is performed offline, and (3) too many AABBs can cause a high overhead of GPU texture update calls.

---

Algorithm 3 Temporal compression for depth frames D

Precondition: Depth images D for N frames
Output: A vector C of compressed frames, each stored as a list of rectangular frame data with the corresponding rectangle
1: function CompressDepthImages(D, N)
2:     $r \leftarrow (0,0, w, h)$
3:     $C_0 \leftarrow \{(D_0, r)\}$
4:     for $i \in [1, N - 1]$ do
5:       $C_i \leftarrow \{\emptyset\}$
6:       $D_{\text{diff}} \leftarrow I(|D_i - D_{i-1}| > \in)$ //computes a binary difference map
7:       $R \leftarrow \text{CalculateAABBs}(D_{\text{diff}})$
8:       for $r \in R$ do
9:         $C_i \leftarrow C_i \cup (\text{SubImage}(D_i, r), r)$
10:    return C

---

Figure 3:
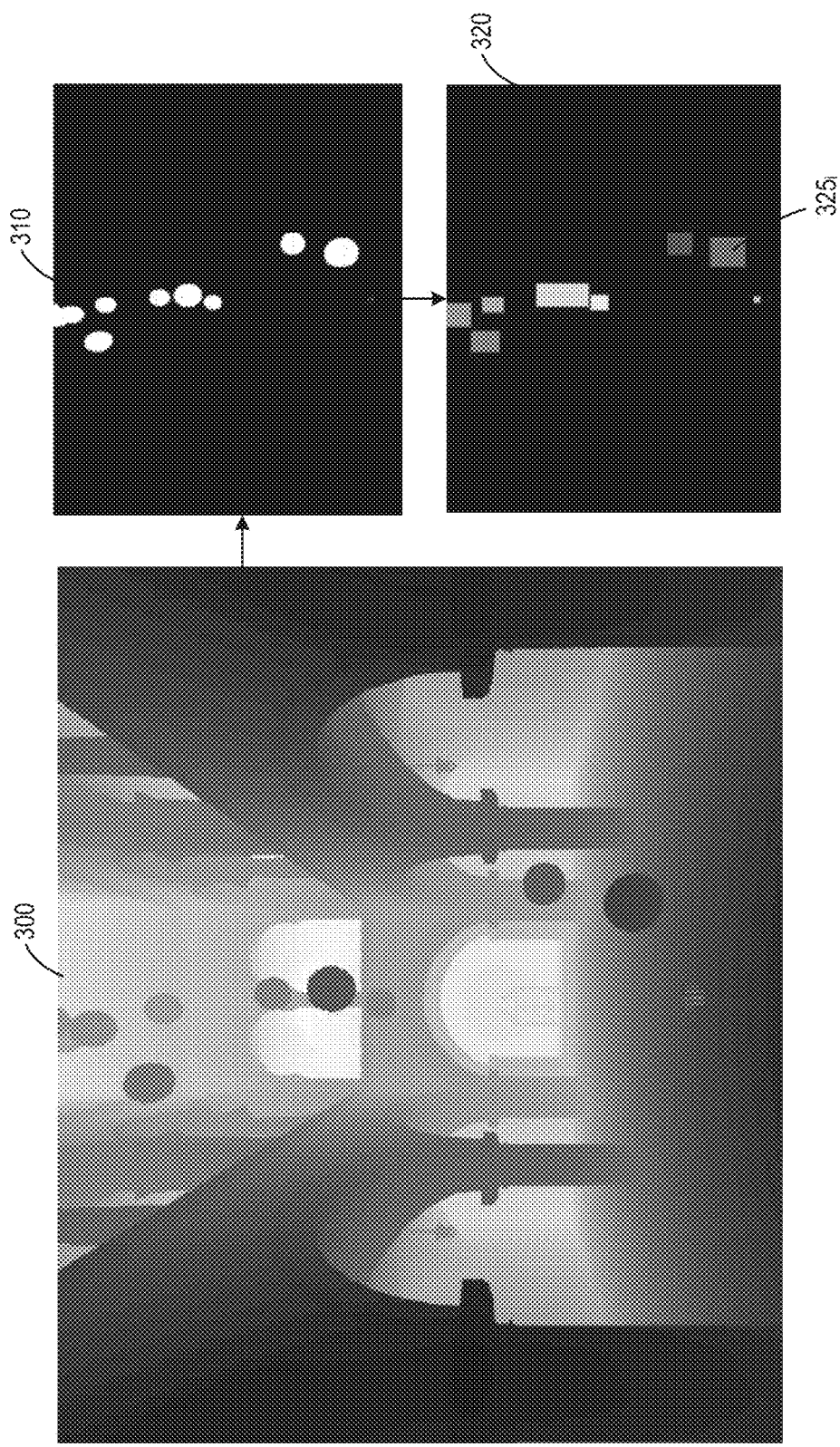
FIG. 3 illustrates an example of depth compression, according to an embodiment.

FIG. 3 illustrates an example of depth compression, according to an embodiment. As shown, for a given depth map 300, the offline application determines depth differences 310 from a previous depth frame, and the offline application then determines a set of AABBs 325$_i$ that encloses the determined depth differences as tightly as possible, e.g., according to algorithm 3. Illustratively, only the balloons and not the walls depicted in the depth map 300 have changed from a previous depth frame, and the offline application determines a minimum number of the AABB 325$_i$ that bound the changing elements and fit as tight as possible, as described above. The resulting compressed stream includes the image data from the rectangular areas of the AABB 325$_i$ and associated rectangle descriptions (where the AABB 325$_i$ are located and their depths), allowing rapid decompression which may in one embodiment include memory cop(ies) in which bytes are read that represent depth data (pixel information) from the rectangular areas, and such depth information is then copied and pasted to the appropriate locations.

Returning to FIG. 1, in addition to the temporal (color and depth) compression at 130, the offline application also performs spatial compression at 140 to generate a BC1 coding of color blocks 142 and a BC5 coding of depth AABBs 144. In some embodiments, the offline application may perform spatial compression using hardware-accelerated block-compression texture formats, such as S3TC, BPTC, RGTC, or ASTC formats, as such formats have fixed data rate and fixed block dimensions. In spatial color compression, if the BCn block dimension is a divisor of the dimension of a cell, described above, then the block-compressed data may be stored directly in the cell data stream. Similarly, in spatial depth compression, if the block dimension is a divisor of corner points of the AABBs described above, then block-compressed data may be stored instead of raw data for each AABB. For color data, compression formats such as BC1, BC6, and BC7 may be used, depending on the quality requirements and dynamic range. In one embodiment, depth values may be generated as 32-bit floating point values, and the offline application may map such values to 16-bit unsigned integers in logarithmic space in order to reduce bandwidth and maintain high precision, according to the following conversion:

$$z_u = (2^{16} - 1)\log\left(\frac{z}{z_{near}}\right) \Big/ \log\left(\frac{z_{far}}{z_{near}}\right), \quad (13)$$

where $z_{near}$ and $Z_{far}$ are the minimum and maximum depth values, respectively. Logarithmic space may provide a better distribution for the depth values and offer more precision closer to the camera. As there are no traditional hardware-accelerated compression techniques for 16-bit unsigned values, in one embodiment the offline application may split the data of the 16-bit unsigned integers in the logarithmic space into two 8-bit channels and compress such channels using the BC5 texture compression format.

Subsequent to the temporal compression at 130 and the spatial compression at 140 by the offline rendering application, the compressed data may be decompressed and used to construct (render) an immersive 360-degree environment 152 in real time at 150. It should be understood that, if the viewer is at a location of one of the cameras, then the result may be perfect, but if the viewer is somewhere between cameras, then reconstruction is needed to combine data recorded by those cameras in order to generate a final image from the viewer's point of view. In one embodiment, a real-time rendering application may use a ray marching technique, discussed below, to determine the pixel colors in video frames to be displayed to a user. Prior to performing such ray marching, however, the real-time rendering application may select cameras and parts of cameras that are visible in order to improve performance. Typically, not all cubemap cameras and parts of the cubemap cameras will provide useful data at any given time, as the user may only be able to see part of the reconstructed 3D scene due to a limited field of view. For example, viewpoints on the other side of an object from the eye location may provide little useful data compared to viewpoints near the eye. That is, the texture update generally requires all visible parts from all views (of the light field probe camera views formed by spherical cube map panoramas) in the active set to be updated to display the current frame correctly, and some embodiments reduce the amount of data being updated by updating only visible parts for each viewpoint (camera). In addition, a lower number of viewpoints may be used to improve performance and maintain a high frame rate, which can be important for a VR experience. For example, performance drops may be detected and the active set of cameras reduced by dropping lower priority views, as discussed in greater detail below.

In one embodiment, the real-time rendering application may utilize one or more heuristics to select relevant cameras for the scene reconstruction, and the particular heuristics used may be chosen by a user to, e.g., ensure a certain performance or cover the visible portions of the scene. In such a case, the heuristics may include heuristics used to determine a prioritized set of viewpoints for each video frame being rendered, with such prioritization helping to maintain coherence of the set elements across frames, and such coherence may affect the rate of updates, as every time the viewpoint changes the associated texture data needs to be updated as well. Aside from prioritization, the real-time rendering application may also use viewpoint culling for additional control over the active viewpoint set. In some embodiments, a combination of distance- and angle-based prioritization techniques and angle- and performance-based culling techniques may be used. For example, a prioritization technique may be used to sort the view locations, and one or more culling techniques may then be applied, such as applying the angle-based culling to skip redundant views and the performance-based culling to ensure that a desired level of performance is maintained. In addition, the real-time rendering application may rearrange the set of views determined through prioritization and culling so that the order of the active viewpoints is maintained as much as possible with respect to the previous frame.

In distance-based prioritization, the real-time rendering application may sort viewpoints based on their distances to the eye (with the closest point having the highest priority). Such a prioritization is useful in scenarios where the user moves through a large space of distributed viewpoints, as only nearby viewpoints provide useful data. Experience has shown that distance-based prioritization works well with the rendering contribution weight $w_{cam}$ in algorithm 4, below.

In angle-based prioritization, the real-time rendering application sorts viewpoints based on their angle to the eye location, using a reference point as the origin (i.e., the smallest angle is highest priority). Such angle-based prioritization is useful in scenarios where a model is captured from all angles, in which case the reference point may be set as the center of the model. Experience has shown that angle-based prioritization works well with heavy view-dependent effects, as the prioritized cameras have the best matching data.

In angle-based culling, the real-time rendering application does not place, in the active viewpoint set, viewpoints forming an angle with another, higher-priority viewpoint that is smaller than a given threshold, using the eye location as the origin. The reasoning behind angle-based culling is that when the angle between two viewpoints is very small, the redundancy is very high, so the higher-priority viewpoint may be used instead.

In performance-based culling, the real-time rendering application culls low-priority viewpoints if the runtime performance is below a given level. Given an estimated cost that a view incurs on the runtime and the current runtime performance, the real-time rendering application estimates how many views need to be culled in order to reach a performance target. Performance-based culling allows the real-time rendering application to maintain a high frame rate, thereby improving user experience, such as in VR applications where a low frame rate can introduce flickering with physical discomfort.

After the selection of cameras using the prioritization and culling techniques discussed above, the real-time rendering application further selects parts of those cameras for view-dependent decoding. As described, a user may only be able to see part of a reconstructed 3D scene at any given time, so decoding entire cubemap frames may be unnecessary and hurt performance. In one embodiment, parts of cameras are selected to support view-dependent decoding, in which only those parts that are visible to viewers are decoded, thereby lowering the per-frame bandwidth required to update viewpoint texture data. As described, the compression of color data in one embodiment may include compressing smaller streams of independent cells. In such a case, each cell of a particular viewpoint may create a world-space pyramid that extends to infinity, formed by all lines originating from the viewpoint and intersecting the cell surface on a cube centered at the viewpoint. Video content for the cell may only be projected within the frustum that is obtained by cutting off the volume of the pyramid before and after the minimum $z_{near}$ and maximum $z_{far}$ depth values, as the depth values may only lie within this range. If such a frustum does not intersect with the viewing camera frustum (the volume of the viewer) at a given frame, the data in the cell does not need to be updated, as the cell cannot be seen by the viewer. Depth video streams can benefit from the same optimization by splitting each stream into tiles and compressing each of the tiles individually. For example, a 2×2 tile grid per cubemap face may be used for depth data, to benefit from view-dependent decoding optimization without introducing too many new partitions and AABBs. With the view-dependent decoding described above, only 50% of the scene data is decoded in the worst-case scenario.

After the selection of the cameras and the visible parts of the cameras, the real-time rendering application reconstructs the scene using ray marching, as well as decompression of (temporally and spatially) compressed color and depth data, in two stages: (1) determining the intersection with scene geometry of the ray for each pixel of the frame, and (2) determining the color contribution from all views (of the light field probe camera views formed by spherical cube map panoramas). To determine an intersection with geometry of a ray, the real-time rendering application may march in small steps along the ray until reaching an intersection (if any) with a surface, which would occur where all recorded depths of the cameras (to which rays are shot at each step) are before the depth at the step. If even one camera's recorded depth is further away than the depth at a step, then no intersection has been found as the ray is still in empty space before recorded geometry for that camera. More formally, a point on the ray hits a surface at the first occurrence where BetweenViewpointAndGeometry is false for all viewpoints, where BetweenViewpointAndGeometry returns true if, at a point p, the distance from a viewpoint v sampled using the direction p−v is farther than |p−v|. Conversely, if there is even one case where the point on the ray is between a viewpoint and its reconstructed position at that direction, then the point is in empty space. The ray marching described above is constant in the non-linear space that depths are stored, so that resolution is higher near the camera. The second stage of reconstructing the scene, determining the color contribution from all views, may include shooting rays from the reconstructed surface intersection point (where reconstruction is a selection among the projected 'camera' probe depths into the desired novel visualized view) toward the cameras to sample recorded color and depth, and then determining weighted contributions from each of the cameras based on what angle the viewer is with respect to camera and how close the viewer is to the camera's recorded depth, with closer cameras being weighted to provide greater contributions. In particular, the weighted contributions may utilize the following weighting factors: the distance of the ray point to the closest depth sample from a cubemap camera ($w_{depth}$) and the distance of the ray point to the camera ($w_{cam}$), both of which may be exponential decay functions in one embodiment, with $w_{depth}$ decaying at a faster rate than $w_{cam}$. The weight $w_{depth}$ ensures that the contributed color will be from a sample as near as possible to the ray point. The weight $w_{cam}$ ensures that, if there are a set of samples with similar $w_{depth}$ values, then those $w_{depth}$ values near the camera are preferred, which helps ensure better reconstruction of view-dependent shading.

In one embodiment, the real-time rendering application may reconstruct the scene from a given camera using data for a set of viewpoints (locations and color/depth textures) and camera parameters using ray marching as shown in algorithm 4, below.

---

Algorithm 4 Real-time rendering algorithm
---

Precondition: Set of $N_{view}$ cubemaps $C_j$(color), $D_j$(depth), and their origins $P_j$. Eye location o and direction d. Number of raycasting steps $N_{step}$. Near/far clipping planes $z_{near}$, $z_{far}$. Z conversion functions lin( ), nonlin( ) between linear and nonlinear space using equation (13)
Output: A color $c_{out}$ 1: function BetweenViewpointAndGeometry($p_{cur}$, j, P, D)
2:     x ← $p_{cur}$ − $P_j$
3:     $d_{tex}$ ← SampleCupemap($D_j$, x)
4:     return $d_{tex}$ > nonlin(‖x‖)
5: function SampleColor($p_{cur}$, j, P, C, D)
6:     x ← $p_{cur}$ − $P_j$
7:     $d_{tex}$ ← SampleCupemap($D_j$, x)
8:     $c_{tex}$ ← SampleCupemap($C_j$, x)
9:     $d_{diff}$ ← |$d_{tex}$ − nonlin(‖x‖)|
10:    $w_{depth}$ ← 1/($d_{diff}$ + ε)
11:    $w_{cam}$ ← 1/(‖o − $P_j$‖ + ε)
12:    return ($c_{tex}$, $w_{depth} \cdot w_{cam}$)
13: function Main(C, D, P, o, d)
14:    $c_{out}$ ← (0,0,0,0)         //Initialize output with transparent color
15:
$$s_{nonlin} \leftarrow \frac{\text{nonlin}(z_{far}) - \text{nonlin}(z_{near})}{N_{step}} \quad \text{// Step magnitude}$$
16:    for i ∈ [1, $N_{step}$] do   //Non-linear raymarching
17:       $z_{cur}$ ← lin(nonlin($z_{near}$) + i · $s_{nonlin}$)
18:       $p_{cur}$ ← o + d · $z_{cur}$
19:       $r_{isect}$ ← true
20:       for j ∈ [1, $N_{view}$] do
21:          if BetweenViewpointAndGeometry($p_{cur}$, j, P, D) then
22:            $r_{isect}$ ← false   //We are in empty space, continue marching
23:            break
24:       if $r_{isect}$ then
25:          break
26:    if i = $N_{step}$ then         //Check if ray did not intersect
27:       return $c_{out}$
28:    $c_{sum}$ ← (0,0,0,0)
29:    $w_{sum}$ ← 0
30:    for j ∈ [1, $N_{view}$] do
31:       (c, w) ← SampleColor($p_{cur}$, j, P, C, D)
32:       $c_{sum}$ ← $c_{sum}$ + c
33:       $w_{sum}$ ← $w_{sum}$ + w
34:
$$c_{out} \leftarrow \frac{c_{sum}}{w_{sum}}$$
35:    return $c_{out}$

---

Figure 4:
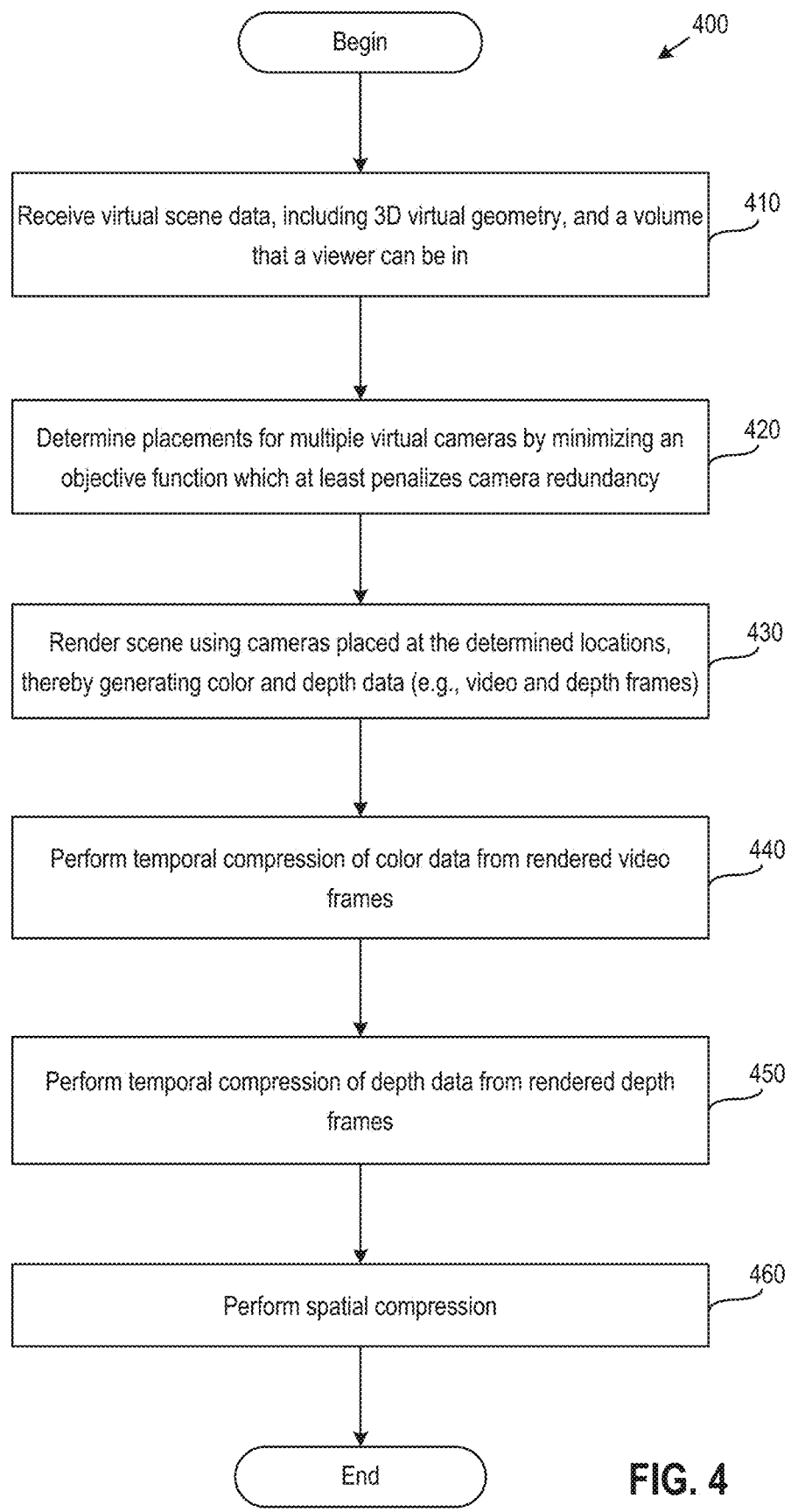
FIG. 4 illustrates a method of off-line preparation, rendering, and compression, according to an embodiment.

FIG. 4 illustrates a method 400 of off-line preparation, rendering, and compression, according to an embodiment. As shown, the method 400 begins at block 410, where an offline rendering and compression application receives animated virtual scene data, including 3D virtual geometry, and a volume that a viewer can be in.

At block 420, the offline application determines placements for multiple virtual cameras by minimizing an objective function which at least penalizes camera redundancy. In particular, the cameras are placed inside of the volume that the viewer can be, and the camera placements are determined so as to provide full motion light field visibility. As described, minimizing the objective function may include evaluating the objective function for cameras placed in different locations (e.g., randomly) in a brute-force manner, through a non-linear search, or in other suitable manner. Further, the minimization of the objective function may be used to optimize a set of cameras that capture as much information as possible with a smallest number of cameras, thereby minimizing data redundancy. In addition, in the view-dependent specular lighting case, a redundancy penalization term in the objective function may be modified with an angular weight term. In one embodiment, cameras are placed one by one, with each camera being placed to capture as much novel data as possible (as opposed to data that other cameras have already captured), according to algorithm 1 described above.

At block 430, the offline application renders the scene using cameras placed at the determined locations, thereby generating color and depth data (e.g., regular color video frames and corresponding depth frames). Any suitable rendering technique, including standard rendering techniques, may be used to generate the color and depth data for every camera. In particular, any renderer that can output color and depth images in a 360° format (e.g., either equirectangular or cubemap) may be used, with the images being converted to cubemaps if necessary.

At block 440, the offline application performs temporal compression of color data from the rendered video frames. As described, compression is performed to process color and depth images into compressed streams, one per cubemap face per viewpoint sample. In one embodiment, the offline application may perform temporal color compression according to algorithm 2, described above, in which the offline application uses an optimization technique to, in parallel for each of a number of grid cells into which the camera images are divided, determine a smallest selection of keyframes that can be used to derive the rest of the rendered video frames (bidirectionally predicted, B-frames) for the cell with a minimum level of reconstruction quality. In addition, the offline application uses another optimization to determine parameter values for the rest of the video frames used to interpolate closest keyframes forward and backward in time so as to minimize a reconstruction error between interpolated and reference frames.

At block 450, the offline application performs temporal compression of depth data from the rendered depth frames. In one embodiment, the offline application may compress the depth data temporally according to algorithm 3, described above, in which each depth frame is stored as either a keyframe or a P-frame which only encodes differences to a last keyframe using a set of AABBs that are calculated to be as tight as possible.

At block 460, the offline application performs spatial compression. As described, the offline application may perform spatial compression using hardware-accelerated block-compression texture formats, such as the S3TC, BPTC, RGTC, or ASTC formats.

Figure 5:
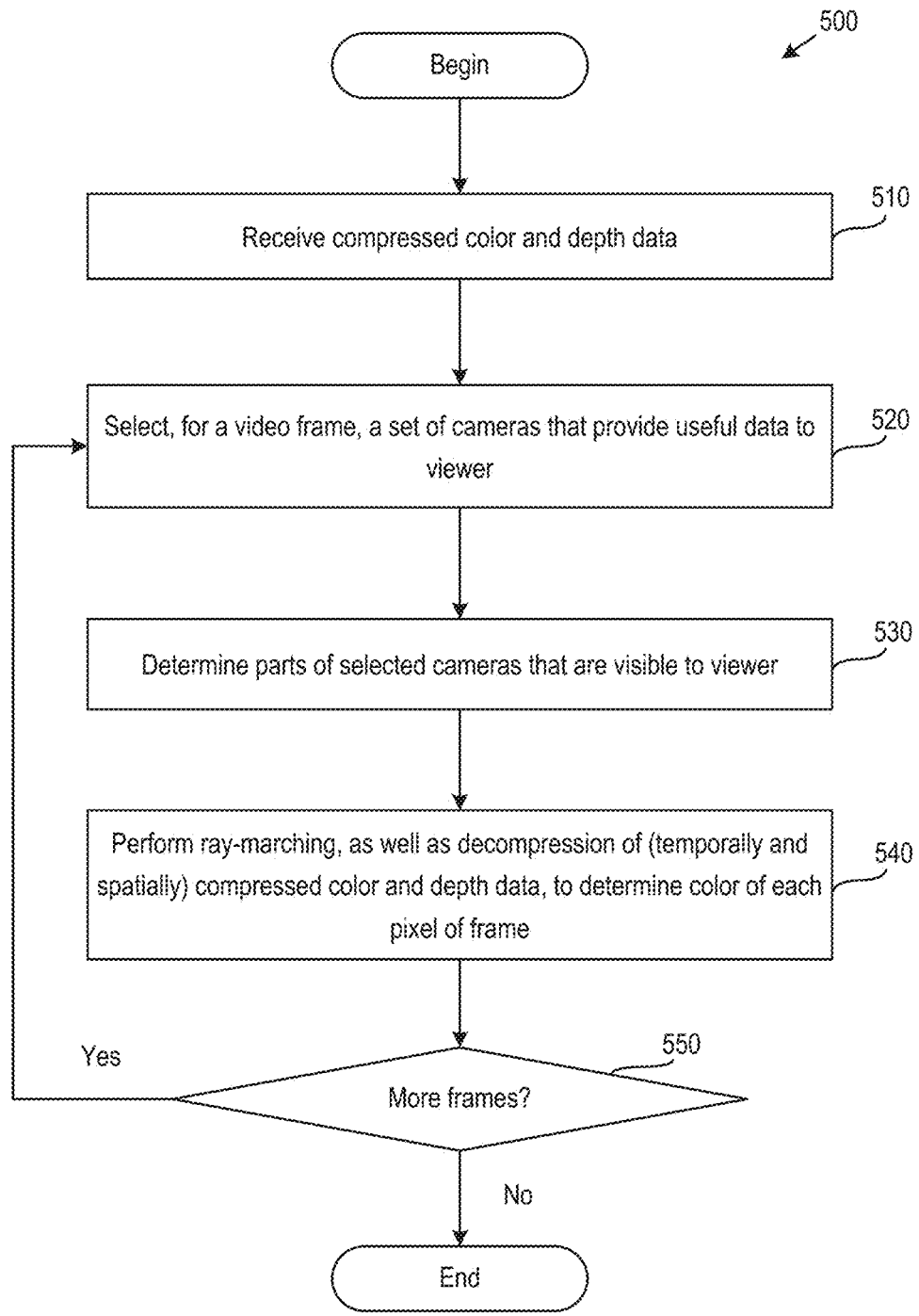
FIG. 5 illustrates a method of real-time decompression and rendering, according to an embodiment.

FIG. 5 illustrates a method 500 of real-time decompression and rendering, according to an embodiment. As shown, the method 500 begins at block 510, where a real-time rendering application receives compressed color and depth data. In one embodiment, the real-time rendering application receives the compressed data that is output by the offline application described above.

At block 520, the real-time rendering application selects, for a video frame being rendered for display to a viewer, a set of cameras that provide useful data to the viewer. In some embodiments, the real-time rendering application may select the set of cameras using one or more of the view-selection heuristics described above, namely a distance-based heuristic which gives higher priority to viewpoints with closer distances to an eye location, an angle-based heuristic which gives higher priority to viewpoints with smaller angles to the eye location, an angle-based culling heuristic which culls any viewpoint forming an angle with another higher priority viewpoint that is smaller than a given threshold, and a performance-based culling heuristic which culls viewpoints whose runtime performance is below a predefined threshold. The particular heuristic(s) used to select the set of cameras may generally be chosen based on user preference for, e.g., performance or quality, with more aggressive selections of cameras reducing quality and vice versa.

At block 530, the real-time rendering application determines parts of the selected cameras that are visible to the viewer. In one embodiment, the real-time rendering application may determine whether a frustum obtained by cutting off a volume of the pyramid for each cell of the viewpoint before and after minimum and maximum z values intersects with the viewing camera frustum (the volume of the viewer) at the frame, and the real-time rendering application may update data in only those cell with such an intersection, as other cells cannot be seen by the viewer.

At block 540, the real-time rendering application performs ray marching, as well as decompression of (temporally and spatially) compressed color and depth data, to determine the color of each pixel of the frame. Such ray marching is able to reconstruct novel frames/views from sparse light field color and depth probes, and may be considered part of the decompression process in addition to the color and depth decompression. As described, the ray marching may include marching along rays shot into the scene for each pixel in small steps to determine intersections (if any) with scene geometry of the rays, and determining the color contribution from all views (of the light field probe camera views formed by spherical cube map panoramas) for each ray. Intersections with scene geometry may be determined based on whether all recorded depths of the cameras (to which rays are shot at each step) are before the depth of the ray at each step of the ray marching. Color contributions from each camera may be determined by shooting rays from the reconstructed surface intersection point toward the cameras to sample the recorded color and depth, and the real-time rendering application may then determine weighted contributions from each of the cameras based on what angle the viewer is with respect to the camera and how close the viewer is to camera's recorded depth. In particular, the weighting may be based on the product of the following weighting factors: the distance of the ray point to the closest depth sample from the cubemap camera and the distance of the ray point to the camera, which may both be exponential decay functions in one embodiment. In one embodiment, each of the rays, corresponding to respective pixels, may be processed in parallel. After the color of each pixel of the frame is determined, the frame may be displayed to a user in any suitable manner, such as via a head-mounted display or other display device such as a screen or even projected in a dome. For example, the frame may be for a 3D movie that was rendered offline according to the method 400 described above. Such a frame may depict a reconstruction of the scene in real time from any point of view (i.e., permit complete free viewpoint) and be displayed to the user via, e.g., a head-mounted display or any other suitable display device.

At block 550, if there are more video frames to render, then the method 500 returns to block 520, where the real-time rendering application selects, for another frame, a set of cameras.

Figure 6:
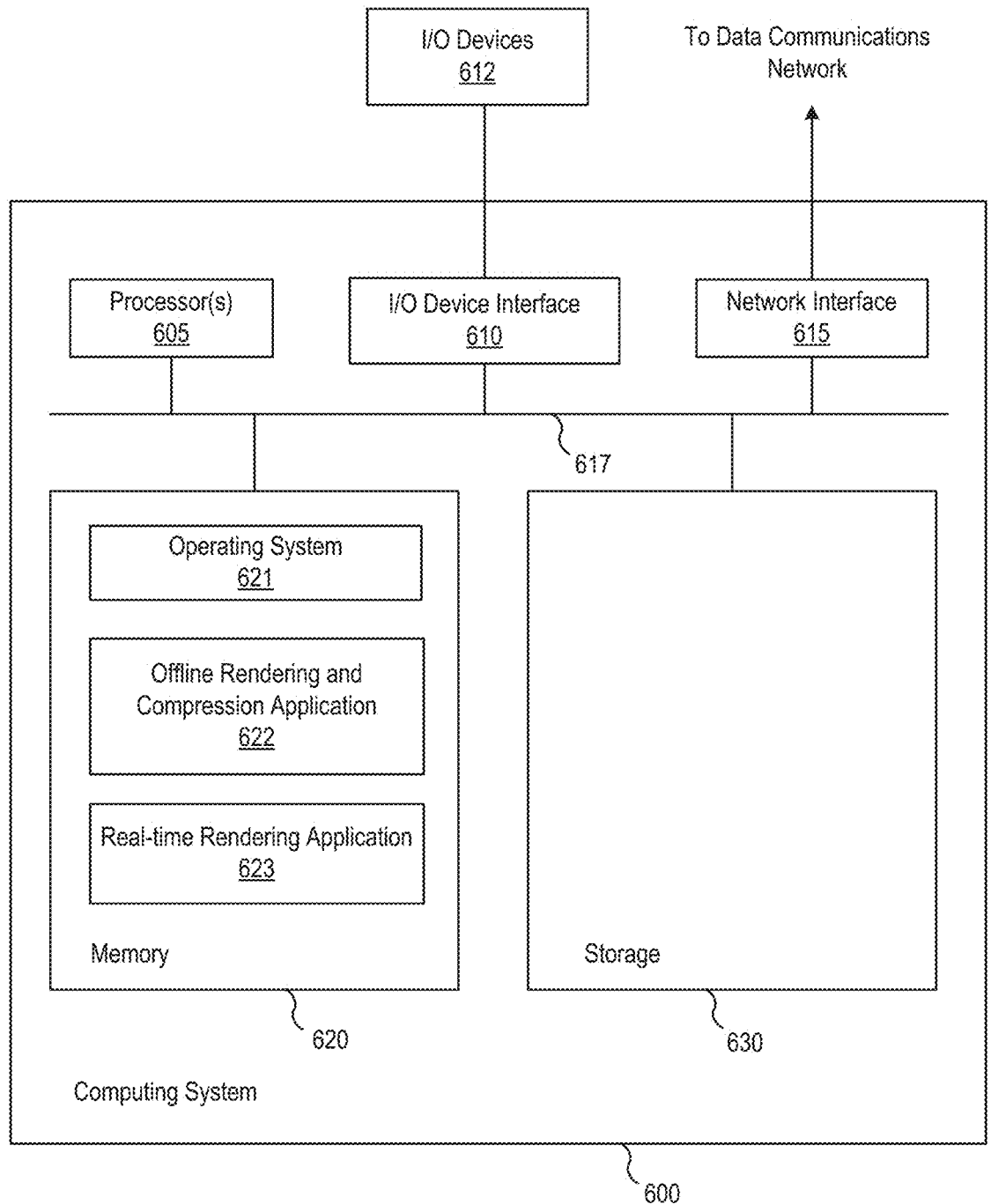
FIG. 6 illustrates a system in which an embodiment may be implemented.

FIG. 6 illustrates a system 600 in which an embodiment may be implemented. As shown, the system 600 includes, without limitation, a central processing unit (CPU) 605, a network interface 615 connecting the system to a network 616, an interconnect 617, a memory 620, and storage 630.

The system 600 may also include an I/O device interface 610 connecting I/O devices 612 (e.g., keyboard, display and mouse devices) to the system 600.

The CPU 605 retrieves and executes programming instructions stored in the memory 620. Similarly, the CPU 605 stores and retrieves application data residing in the memory 620. The interconnect 617 facilitates transmission, such as of programming instructions and application data, between the CPU 605, I/O device interface 610, storage 630, network interface 615, and memory 620. CPU 605 is included to be representative of a single CPU, multiple CPUs, a single CPU having multiple processing cores, one or more GPUs, a combination of such processors, and the like. And the memory 620 is generally included to be representative of a random access memory. The storage 630 may be a disk drive storage device. Although shown as a single unit, the storage 630 may be a combination of fixed and/or removable storage devices, such as magnetic disk drives, flash drives, removable memory cards or optical storage, network attached storage (NAS), or a storage area-network (SAN). Further, system 600 is included to be representative of a physical computing system as well as virtual machine instances hosted on a set of underlying physical computing systems. Further still, although shown as a single computing system, one of ordinary skill in the art will recognized that the components of the system 600 shown in FIG. 6 may be distributed across multiple computing systems connected by a data communications network.

As shown, the memory 620 includes an operating system 621, an offline rendering and compression application 622, and a real-time rendering application 623. Illustratively, the operating system 621 may include Linux® or Windows®. The offline rendering and compression application 622 is configured to perform offline rendering using a number of determined cameras and compress the resulting color and depth data. In one embodiment, the offline rendering and compression application 622 may receive scene data and a volume that a viewer will be in, determine placements for multiple cameras by minimizing an objective function which at least penalizes camera redundancy, render the scene using cameras placed at the determined locations, thereby generating color and depth data (e.g., regular color video frames and corresponding depth frames), perform temporal compression of the color data, perform temporal compression of the depth data, and perform spatial compression of color and depth data, according to the method 400 described above. The real-time rendering application 623 is configured to render video frames of a 3D virtual environment in real-time using the output of the offline rendering and compression application 622. In one embodiment, the real-time rendering application 623 may receive compressed color and depth data and, for each video frame to be displayed to a user: select a set of cameras that provide useful data, determine parts of the selected cameras that are visible to a viewer, and perform ray marching, as well as decompression of (temporally and spatially) compressed color and depth data, to determine the color of each pixel of the frame, according to the method 500 described above.

Advantageously, the end-to-end pipeline disclosed herein permits dynamic scenes with movie-quality animated graphics to be displayed to a user (e.g., using a head-mounted VR display) while still allowing the sense of presence afforded by free viewpoint head motion. In particular, camera placement techniques are disclosed for determining a sparse set of cameras that can capture the scenes in various lighting environments and dynamic scenes, with the positioning of cameras being optimized for offline rendering to capture the scene with the least number of cameras for a given lighting environment complexity. That is, the determination of camera placements is such that full motion light fields are reconstructable from sparse camera placements effectively, which solves the gallery problem for the case of animated light fields, i.e., the camera placement techniques disclosed herein solve a higher dimensional problem, which includes spatial, temporal, and view dependent variable content (varying color and depth and therefore visibility over space, time, and viewpoint). Content rendered offline using the determined cameras may further be encoded using GPU-friendly temporal compression techniques, for color and depth data, that may reduce video stream memory requirements (including lower GPU upload bandwidth use) and integrate with raw or block-compressed data of various spatial pixel formats. Thereafter, the encoded data may be decoded in real-time from an arbitrary viewpoint within a predefined view volume, allowing motion parallax, head tilting, and rotations. View-dependent decoding may be performed in which cameras and parts of those cameras are chosen depending on the user location and what is visible to the user. Further, the real-time rendering techniques disclosed herein provide the features that (a) reconstruction may be decoupled from decoding the compressed light filed, (b) any type and number of virtual cameras may be used for reconstruction, and (c) cameras are independent of each other (uncorrelated data sets). For example, many users could explore a scene at the same time (one decoder, several eye pairs for reconstruction), allowing a collaborative virtual environment with film-quality visuals. As another example, as the per-camera data is uncorrelated, datasets may be enriched or replaced at a later time allowing, for example, users to explore a scene from locations not possible before. As a result, users can consume media, such as VR, 3D movies, video games, augmented reality application of light fields (e.g., where the real environment lighting is applied to relight light field represented surfaces), live virtual production use cases (e.g., where a performance capture actor is seamlessly rendered with a movie computer graphics set), or other 3D environments produced used techniques disclosed herein in an immersive manner.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method, comprising:
   determining placements for a plurality of virtual cameras in a virtual scene;
   generating color data and depth data via offline rendering of the virtual scene using the virtual cameras at the determined placements;
   compressing the color data and the depth data;
   decompressing at least a portion of the compressed data;
   reconstructing one or more video frames in real time from a specified viewpoint different from the determined placements, wherein the specified viewpoint is determined in real time based on physical movement of a user, wherein the one or more video frames are reconstructed by operation of one or more computer processors using the decompressed portion of the compressed data; and
   outputting the reconstructed one or more video frames.

2. The computer-implemented method of claim 1, wherein the placements for the plurality of virtual cameras are determined based, at least in part, on an objective function which includes a term that penalizes camera redundancy.

3. The computer-implemented method of claim 2, wherein:
   the virtual scene includes a specular lighting environment; and
   the term in the objective function that penalizes camera redundancy includes an angular weight term.

4. The computer-implemented method of claim 1, wherein compressing the color data includes temporally compressing the color data, the temporal compression of the color data comprising:
   dividing each of a plurality of rendered video frames into a plurality of grid cells; and
   for each grid cell of the plurality of grid cells:
      determining, using an optimization process, a smallest selection of keyframes of the grid cell that can be used to derive other frames of the grid cell, and
      storing the determined keyframes and an array including parameter values for each of the other frames of the grid cell, wherein each of the parameter values indicates, for a corresponding one of the other frames, interpolations of closest keyframes to the one of the other frames forward and backward in time.

5. The computer-implemented method of claim 1, wherein compressing the depth data includes temporally compressing the depth data, the temporal compression of the depth data comprising:
   determining one or more keyframes from rendered depth frames; and
   storing depth frames from the rendered depth frames that are not the one or more keyframes as P-frames that each encode differences to a last keyframe.

6. The computer-implemented method of claim 5, wherein the differences to the last keyframe are encoded using a set of axis-aligned bounding boxes (AABBs) in a leaf level of an AABB hierarchy.

7. The computer-implemented method of claim 1, wherein decompressing at least the portion of the compressed data includes:
   selecting a plurality of the virtual cameras using one or more heuristics;
   selecting grid cells from the selected cameras that are visible to a viewer; and
   decompressing the selected grid cells.

8. The computer-implemented method of claim 1, wherein the compressed data is stored and subsequently retrieved, wherein the placements for the plurality of virtual cameras are determined based, at least in part, on an objective function which includes a term that penalizes camera redundancy wherein the term in the objective function that penalizes camera redundancy includes an angular weight term, wherein the virtual scene includes a specular lighting environment;
   wherein the specified viewpoint is disposed within a predefined view volume, wherein the physical movement comprises, in respective instances, motion, tilting, and rotations, wherein the reconstructed one or more video frames are output via a head-mounted virtual reality (VR) display.

9. The computer-implemented method of claim 8, wherein compressing the color data includes temporally compressing the color data, the temporal compression of the color data comprising:
   dividing each of a plurality of rendered video frames into a plurality of grid cells; and
   for each grid cell of the plurality of grid cells:
      determining, using an optimization process, a smallest selection of keyframes of the grid cell that can be used to derive other frames of the grid cell, and
      storing the determined keyframes and an array including parameter values for each of the other frames of the grid cell, wherein each of the parameter values indicates, for a corresponding one of the other frames, interpolations of closest keyframes to the one of the other frames forward and backward in time.

10. The computer-implemented method of claim 9, wherein compressing the depth data includes temporally compressing the depth data, the temporal compression of the depth data comprising:
   determining one or more keyframes from rendered depth frames; and
   storing depth frames from the rendered depth frames that are not the one or more keyframes as P-frames that each encode differences to a last keyframe, wherein the differences to the last keyframe are encoded using a set of axis-aligned bounding boxes (AABBs) in a leaf level of an AABB hierarchy;
   wherein decompressing at least the portion of the compressed data includes:
   selecting a plurality of the virtual cameras using one or more heuristics;
   selecting grid cells from the selected cameras that are visible to a viewer; and
   decompressing the selected grid cells.

11. The computer-implemented method of claim 10, wherein the one or more heuristics comprises a plurality of heuristics including:
   a distance-based heuristic which gives higher priority to viewpoints with closer distances to an eye location;
   an angle-based heuristic which gives higher priority to viewpoints with smaller angles to the eye location;
   an angle-based culling heuristic which culls any viewpoint forming an angle with another higher priority viewpoint that is smaller than a given threshold; and
   a performance-based culling heuristic which culls viewpoints whose runtime performance is below a predefined threshold.

12. The computer-implemented method of claim 11, wherein selecting the grid cells from the selected virtual cameras that are visible to the viewer includes:
- determining whether a respective frustum corresponding to each grid cell of the grid cells and obtained by cutting off a volume of a pyramid for the grid cell before and after minimum and maximum depth values, respectively, intersects with a frustum of a viewing virtual camera; and
- selecting cells associated with intersections between the frusta corresponding to the grid cells and the frustum of the viewing virtual camera.

13. The computer-implemented method of claim 12, wherein decompressing the selected grid cells includes performing ray tracing comprising:
- marching rays until intersections with surfaces in the virtual scene are found; and
- for each of the rays for which a respective intersection is found, determining a pixel color based, at least in part, on a product of a distance of a ray point at the respective intersection to a closest depth sample from one of the cameras and a distance of the ray point to the one of the cameras.

14. A non-transitory computer-readable medium storing a program executable to perform operations comprising:
- determining placements for a plurality of virtual cameras in a virtual scene;
- generating color data and depth data via offline rendering of the virtual scene using the virtual cameras at the determined placements
- compressing the color data and the depth data;
- decompressing at least a portion of the compressed data;
- reconstructing one or more video frames in real time from a specified viewpoint different from the determined placements, wherein the specified viewpoint is determined in real time based on physical movement of a user, wherein the one or more video frames are reconstructed using the decompressed portion of the compressed data and by one or more computer processors when executing the program; and
- outputting the reconstructed one or more video frames.

15. The non-transitory computer-readable medium of claim 14, wherein the placements for the plurality of virtual cameras are determined based, at least in part, on an objective function which includes a term that penalizes camera redundancy.

16. The non-transitory computer-readable medium of claim 15, wherein:
- the virtual scene includes a specular lighting environment; and
- the term in the objective function that penalizes camera redundancy includes an angular weight term.

17. The non-transitory computer-readable medium of claim 14, wherein compressing the color data includes temporally compressing the color data, the temporal compression of the color data comprising:
- dividing each of a plurality of rendered video frames into a plurality of grid cells; and
- for each grid cell of the plurality of grid cells:
  - determining, using an optimization process, a smallest selection of keyframes of the grid cell that can be used to derive other frames of the grid cell, and
  - storing the determined keyframes and an array including parameter values for each of the other frames of the grid cell, wherein each of the parameter values indicates, for a corresponding one of the other frames, interpolations of closest keyframes to the one of the other frames forward and backward in time.

18. The non-transitory computer-readable medium of claim 14, wherein compressing the depth data includes temporally compressing the depth data, the temporal compression of the depth data comprising:
- determining one or more keyframes from rendered depth frames; and
- storing depth frames from the rendered depth frames that are not the one or more keyframes as P-frames that each encode differences to a last keyframe.

19. The non-transitory computer-readable medium of claim 18, wherein the differences to the last keyframe are encoded using a set of axis-aligned bounding boxes (AABBs) in a leaf level of an AABB hierarchy.

20. A system, comprising:
- one or more computer processors; and
- a memory containing an application program executable by the one or more computer processors to perform operations comprising:
  - determining placements for a plurality of virtual cameras in a virtual scene;
  - generating color data and depth data via offline rendering of the virtual scene using the virtual cameras at the determined placements;
  - compressing the color data and the depth data;
  - decompressing at least a portion of the compressed data;
  - reconstructing one or more video frames in real time from a specified viewpoint different from the determined placements, wherein the specified viewpoint is determined in real time based on physical movement of a user, wherein the one or more video frames are reconstructed using the decompressed portion of the compressed data; and
  - outputting the reconstructed one or more video frames.

* * * * *

UNITED STATES PATENT AND TRADEMARK OFFICE
CERTIFICATE OF CORRECTION

PATENT NO. : 10,636,201 B2  
APPLICATION NO. : 15/971950  
DATED : April 28, 2020  
INVENTOR(S) : Kenneth J. Mitchell et al.

It is certified that error appears in the above-identified patent and that said Letters Patent is hereby corrected as shown below:

In the Specification

In Column 4, Lines 65-66, delete "computer implemented" and insert -- computer-implemented --, therefor.

In Column 6, Line 2, delete "λt)" and insert -- λ, t) --, therefor.

In Column 6, Line 62, delete "$e^{-k max(|\vec{xO}|-Z(x), 0)}$" and insert -- $e^{-k\max(|\vec{xO}|-Z(x),0)}$ --, therefor.

In Column 7, Line 3, delete "$e^{-k max(|\vec{xO}|-Z(x),0)})$" and insert -- $e^{-k\max(|\vec{xO}|-Z(x),0)})$ --, therefor.

In Column 7, Line 5, delete "$e^{-k max(|\vec{xO}|-Z(x),0)}$" and insert -- $e^{-k\max(|\vec{xO}|-Z(x),0)}$ --, therefor.

In Column 7, Line 14, delete "$f(O, C, S)$" and insert -- $f(\mathbf{O}, \mathbf{C}, \mathbf{S})$. --, therefor.

In Column 7, Line 67, delete "dxdt" and insert -- dxdt. --, therefor.

In Column 9, Line 8, delete "$g(x, n)=\mathrm{argmax}_t q(x, n, t)$" and insert -- $g(x, n) = \mathrm{argmax}_t\, q(x, n, t)$. --, therefor.

Signed and Sealed this  
Twenty-first Day of July, 2020

Andrei Iancu  
*Director of the United States Patent and Trademark Office*

In Column 10, Line 20, delete "with the corresponding rectangle" and insert the same on, in Column 10, Line 19, as a continuation of the same line.

In Column 11, Line 13, delete "Z$_{far}$" and insert -- z$_{far}$ --, therefor.

In Column 14, Line 15, delete "SampleCupemap" and insert -- SampleCubemap --, therefor.

In Column 14, Line 18, delete "SampleCupemap" and insert -- SampleCubemap --, therefor.

In Column 14, Line 19, delete "SampleCupemap" and insert -- SampleCubemap --, therefor.

In the Claims

In Column 21, Line 30, in Claim 14, delete "placements" and insert -- placements; --, therefor.